(Model.)

D. KOLLE.
Vehicle Wheel Hub.

No. 233,776. Patented Oct. 26, 1880.

Attest:
W. H. H. Knight,
Fred F. Church.

Inventor:
Dalton Kolle,
By Hill & Church,
His Attys.

UNITED STATES PATENT OFFICE.

DALLTOR KOLLE, OF RIPON, WISCONSIN.

VEHICLE-WHEEL HUB.

SPECIFICATION forming part of Letters Patent No. 233,776, dated October 26, 1880.

Application filed July 27, 1880. (Model.)

*To all whom it may concern:*

Be it known that I, DALLTOR KOLLE, of Ripon, in the county of Fond du Lac and State of Wisconsin, have invented a new and Improved Vehicle-Wheel; and I do hereby declare the following to be a full and exact description of the same, reference being had to the accompanying drawings, forming part of this specification, in which—

Figure 1:
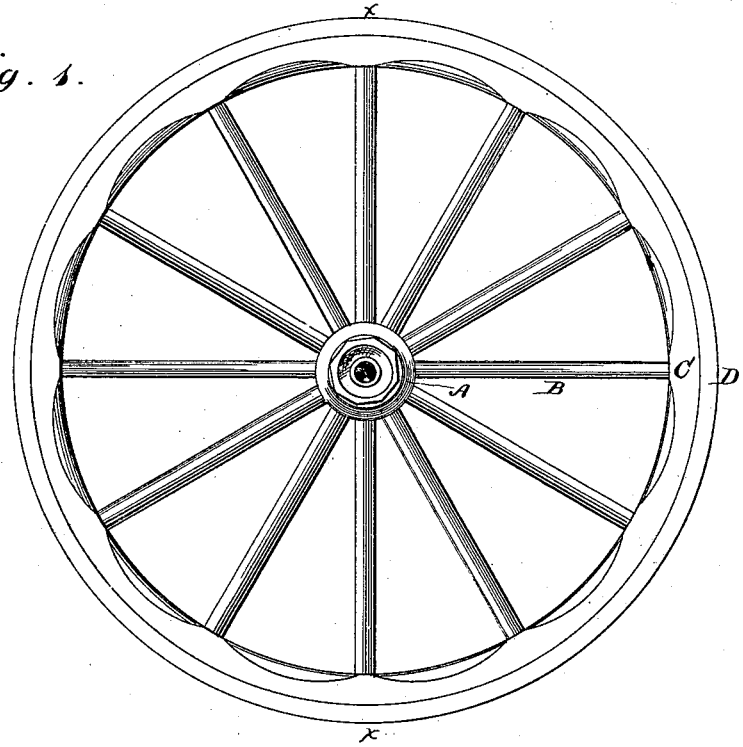
Figures 2, 3:
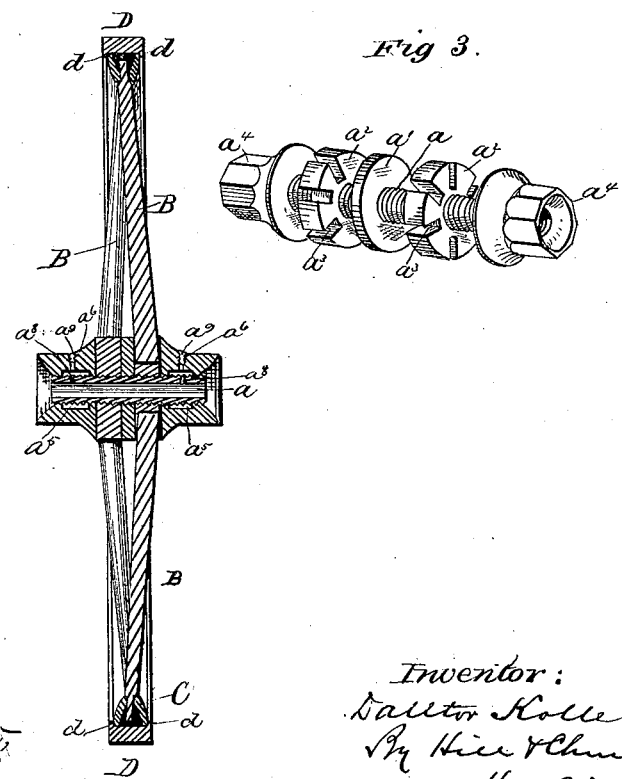

Figure 1 represents a side elevation of a wheel constructed in accordance with my invention; Fig. 2, a sectional view taken on the line $x\,x$, Fig. 1; and Fig. 3, a perspective view of the parts composing the hub.

Similar letters of reference in the several figures indicate the same parts.

This invention relates to improvements in vehicle-wheels; and it consists in the novel construction of the hub, as I will now proceed to describe.

In the drawings, A represents the hub, B the spokes, C the felly, and D the tire.

The hub consists of an externally screw-threaded tubular box, $a$, which forms the bearing of the axle, a central plate or washer, $a'$, screwed upon said tubular box, two plates, $a^2$ $a^2$, screwed onto the tubular box against opposite sides of the washer $a'$, and having radial recesses or sockets $a^3$, for the accommodation of the inner ends of the spokes, and nuts or caps $a^4\,a^4$, screwed onto the ends of the tubular box and operating to tightly clamp the parts of the hub together and properly hold the spokes in position.

The sockets in one of the socket-plates $a^2$ break joints with those in the other plate, so that the successive spokes may be arranged alternately in the two plates and permitted to incline inwardly to enable their outer shouldered ends to enter a single line of perforations or sockets in the felly C. This arrangement of the spokes not only renders the hub stronger, but tends to strengthen the whole wheel.

In order to keep the bearing of the axle at all times properly lubricated, each of the caps $a^4\,a^4$ is provided with an annular chamber or reservoir, $a^5$, to which access is had from without through a hole, $a^6$, closed by a screw-plug, $a^9$. Opposite the chamber or reservoir in each cap is a hole, $a^8$, in the tubular box, through which communication is had with the bearing of the axle.

The chambers or reservoirs are filled with oil through the holes $a^6$, and the oil flows to the bearing through the holes $a^8$ as fast as required. By this arrangement the necessity of removing the wheel every time it is desired to lubricate its bearing is dispensed with.

The felly C of the wheel is preferably rolled out of iron or steel, and is preferably V-shaped in cross-section, as shown in Fig. 2, and the tire D, which surrounds it, is formed on the inside with raised edges or side flanges, $d\,d$, which embrace the felly and prevent the tire by any possibility from coming off after it is once secured in place.

The wheels may be made dishing or not, at the option of the manufacturer. As a whole the wheel is strong, light, easily put together, and comparatively inexpensive to manufacture, and it is regarded as a valuable acquisition to the trade.

I claim as my invention—

In a vehicle-wheel, the combination of the screw-threaded tubular box or bearing $a$, the central washer, $a'$, the socket-plates $a^2\,a^2$, having the radial recesses or sockets $a^3$, for receiving the ends of the spokes, and the caps $a^4\,a^4$, for clamping the socket-plates against the central washer and holding the spokes firmly within their sockets, substantially as described.

DALLTOR KOLLE.

Witnesses:
W. R. LYLE,
H. L. BARNES.